United States Patent
Ichihara et al.

(10) Patent No.: US 7,955,417 B2
(45) Date of Patent: Jun. 7, 2011

(54) METHOD FOR REDUCING ORGANIC CHLORINE COMPOUNDS IN CEMENT PRODUCTION FACILITY, AND CEMENT PRODUCTION FACILITY

(75) Inventors: Katsuhiko Ichihara, Chichibu-gun (JP); Eiji Koike, Chichibu-gun (JP); Munenori Ohgoshi, Kitakyushu (JP); Hisanobu Tanaka, Fukaya (JP); Ichiro Ebato, Kitakyushu (JP); Kimitoshi Mizutani, Kitakyushu (JP)

(73) Assignee: Mitsubishi Materials Corporation, Tokyo (JP)

( * ) Notice: Subject to any disclaimer, the term of this patent is extended or adjusted under 35 U.S.C. 154(b) by 268 days.

(21) Appl. No.: 11/994,066

(22) PCT Filed: Jun. 30, 2006

(86) PCT No.: PCT/JP2006/313101
§ 371 (c)(1),
(2), (4) Date: Dec. 27, 2007

(87) PCT Pub. No.: WO2007/004564
PCT Pub. Date: Jan. 11, 2007

(65) Prior Publication Data
US 2008/0264252 A1    Oct. 30, 2008

(30) Foreign Application Priority Data

Jun. 30, 2005 (JP) .................... P2005-192353
Aug. 8, 2005 (JP) .................... P2005-230079
Sep. 8, 2005 (JP) .................... P2005-260189

(51) Int. Cl.
*B01D 53/02* (2006.01)
(52) U.S. Cl. .......... 95/132; 95/94; 95/107; 96/132; 96/150

(58) Field of Classification Search .......... 95/94, 107, 95/132; 96/132, 150
See application file for complete search history.

(56) References Cited

U.S. PATENT DOCUMENTS

| | | | | |
|---|---|---|---|---|
| 4,115,137 A | * | 9/1978 | Nudelman et al. | 106/740 |
| 4,154,803 A | * | 5/1979 | Uchikawa et al. | 423/239.1 |
| 2004/0173096 A1 | * | 9/2004 | Terasaki et al. | 95/271 |

FOREIGN PATENT DOCUMENTS

JP    2000-157832    6/2000
(Continued)

OTHER PUBLICATIONS

Translation of JP 2001-000836 (Mitsui Mining Co., Lrd.), Jan. 9, 2001.*

(Continued)

*Primary Examiner* — Robert J Hill, Jr.
*Assistant Examiner* — Christopher P Jones
(74) *Attorney, Agent, or Firm* — Oblon, Spivak, McClelland, Maier & Neustadt, L.L.P.

(57) ABSTRACT

The method for reducing organic chlorine compounds in the cement production facility of the present invention is a method for reducing organic chlorine compounds in cement production facility by which a quantity of organic chlorine compounds contained in cement raw materials is reduced in the cement production facility, which is provided with an organic matter adsorbing step in which an adsorbing powder is supplied into exhaust gas generated on calcination of cement clinker from the cement raw materials, thereby the organic chlorine compounds are adsorbed on the adsorbing powder and an adsorbing-powder removing step in which the adsorbing powder, which has adsorbed the organic chlorine compounds, is collected, thereby removing the adsorbing powder from the exhaust gas.

11 Claims, 6 Drawing Sheets

FOREIGN PATENT DOCUMENTS

| | | |
|---|---|---|
| JP | 2001-836 | 1/2001 |
| JP | 2001-137663 | 5/2001 |
| JP | 2001-253735 | 9/2001 |
| JP | 2002-147722 | 5/2002 |
| JP | 2002-233732 | 8/2002 |
| JP | 2004-89829 | 3/2004 |
| JP | 2004-244308 | 9/2004 |
| JP | 2005-29402 | 2/2005 |
| JP | 2005192353 A * | 7/2005 |
| JP | 2005230079 A * | 9/2005 |
| JP | 2005260189 A * | 9/2005 |
| JP | 2006-96615 | 4/2006 |

OTHER PUBLICATIONS

Translation of JP 2001-253735 A (Clean Japan Center et al.), Sep. 18, 2001.*

Translation of JP 2000-157832 A (NKK Corp.), Jun. 13, 2000.*

Translation of JP 2002-233732 A (Taiheiyo Cement Crop.), Aug. 20, 2002.*

Translation of JP 2001-137663 A (Mitsubishi Heavy Industries, Ltd.), May 22, 2001.*

U.S. Appl. No. 11/917,683, filed Dec. 14, 2007, Ichihara, et al.

* cited by examiner

METHOD FOR REDUCING ORGANIC CHLORINE COMPOUNDS IN CEMENT PRODUCTION FACILITY, AND CEMENT PRODUCTION FACILITY

CROSS REFERENCE TO RELATED APPLICATION

This application is a 371 of PCT/JP06/313101, filed on Jun. 30, 2006, and claims priority to the following Japanese Patent Applications: JP 2005-192353, filed on Jun. 30, 2005; JP 2005-230079, filed on Aug. 8, 2005; and JP 2005-260189, filed on Sep. 8, 2005.

TECHNICAL FIELD

The present invention relates to a method for reducing organic chlorine compounds in cement production facility and the cement production facility, more specifically, relates to technologies capable of heat-treating organic chlorine compounds such as dioxins and PCBs (polychlorinated biphenyls) exhausted from cement production facility to reduce the exhausted quantities thereof.

The present application claims the right of priority on the basis of Japanese Patent Application No. 2005-192353 filed on Jun. 30, 2005, Japanese Patent Application No. 2005-230079 filed on Aug. 8, 2005 and Japanese Patent Application No. 2005-260189 filed on Sep. 8, 2005, the descriptions of which are incorporated herein by reference.

BACKGROUND ART OF THE INVENTION

Dioxin (PCDD) is an abbreviated name for poly chloro dibenzo-p-dioxin, which is one type of organic chlorine compound. Poly chloro dibenzo-furan (PCDF) is known which is similar to the dioxin.

In particular, 2,3,7,8-tetra chloro dibenzo-p-dioxin (2,3,7,8-T4CDD), which belongs to tetra chloro dibenzo-p-dioxins (T4CDDs), or tetrachlorides of dioxins (PCDDs) and has chlorine in the 2-, 3-, 7-, and 8-positions, is the highest in toxicity.

The 2,3,7,8-tetra chloro dibenzo-p-dioxin is generated as a by-product in the production of trichloro phenol, 2,4,5-trichloro phenoxyacetic acid, and also generated as chloridization of dibenzo-p-dioxin. The melting point is between 306° C. and 307° C.

PCB (polychlorinated biphenyl) is known, which is another organic chlorine compound harmful to humans. PCB high in chemical stability, insulation properties, incombustibility and adherence, has been used as insulating oil for transformers and capacitors installed in electrical equipment at power plants, railways and buildings. However, since PCB contains coplanar PCBs which are toxic as with dioxin, the substance has been prohibited from production, distribution and new applications on the basis of laws developed in 1974.

Methods for treating PCBs include, for example, an incineration treatment method for heat-treating PCBs at high temperatures, a dechlorination decomposition method for subjecting PCBs to dechlorination, a supercritical hydroxylation decomposition method for using supercritical water to decompose PCBs into carbon dioxide and water. Of these methods, with the incineration treatment method, there is a concern that dioxins may be synthesized when gases generated in heat-treating PCBs are cooled.

Then, conventional technologies are known, for example, those described in the following Patent Documents 1 and 2.

Patent Document 1 discloses a method in which gas exhausted from cement production facility is supplied to a dust collector for collecting dust including organic chlorine compounds, and at least some of the thus collected dust is fed into a high temperature part of the cement production facility, which is kept at temperatures exceeding 800° C. Since dioxins undergo thermal decomposition at about 800° C., this method can be used to effectively decompose dioxins. Gas exhausted from cement production facility includes, for example, exhaust gas from a raw material dryer (a raw material processing area) for drying cement raw materials, and exhaust gas from a raw material mill (a raw material processing area) for crushing cement raw materials.

Further, evaporated organic chlorine compounds are contained to some extent also in dust-removed gas which is exhausted from a dust collector and released into the atmosphere from a gas duct. Patent Document 1 has disclosed a method for reducing dioxin concentrations in dust-removed gas as a preventive measure thereof. In other words, exhaust gas is drawn out from a place at which the temperature is kept from 30° C. to 400° C., (a low temperature part) in cement production facility, and the thus drawn out exhaust gas is supplied to the dust collector. Exhaust gas guided from the low temperature part is higher in concentration of organic chlorine compounds (low-temperature concentration) compared with exhaust gas from a high temperature part of the cement production facility. Therefore, this method is used to collect and remove dust in which organic chlorine compounds are concentrated, thus making it possible to reduce the concentration of dioxins in the dust-removed gas.

Patent Document 2 discloses a method for decomposing PCBs, while generation of dioxins is prevented. In other words, PCB-containing materials delivered to a cement plant from the outside are fed into a rotary kiln at which the PCB-containing materials are heated by using heat (1000° C. or higher) generated on calcination of a cement clinker, thereby effecting thermal decomposition of PCBs. Then, after exhaust gas generated on a thermal decomposition is guided from the outside of the rotary kiln, the gas is cooled rapidly at a speed of 20° C./sec or higher. The exhaust gas is rapidly cooled at 20° C./sec or higher, by which the gas passes in a short time through a temperature range at which dioxins are synthesized in an increased quantity. Therefore, this method is used to decompose PCBs, while generation of dioxins is prevented.

PATENT DOCUMENT 1: Japanese Unexamined Patent Application, First Publication No. 2004-244308
PATENT DOCUMENT 2: Japanese Unexamined Patent Application, First Publication No. 2002-147722

DETAILED DESCRIPTION OF THE INVENTION

Problems to be Solved by the Invention

As described previously, in Patent Document 1, exhaust gas is allowed to pass through a dust collector, in which at least some of the thus collected dust is fed into a high temperature part of cement production facility at which the temperature rises up to 800° C. or higher on normal operation to thermally decompose dioxins adsorbed by dust. In this case, as a measure for treating organic chlorine compounds in dust-removed gas (gas which has passed through the dust collector) which is released into the atmosphere through a gas duct, a method is adopted for drawing out exhaust gas from a point (a low temperature part) at which the temperature is kept in the range of 30° C. to 400° C. in cement production facility and supplying the gas to the dust collector.

However, this method is not able to attain a sufficient reduction of dioxins exhausted from cement production facility. In other words, cement raw materials which contain organic chlorine compounds are fed into a raw material dryer and a raw material mill which are heated by exhaust gas from the upper part of a preheater up to an internal temperature of about 300° C., by which dioxins are evaporated. As a result, the exhaust gas (in particular, dust) from the raw material mill contains organic chlorine compounds.

On the other hand, cement raw materials crushed by the raw material mill are continuously fed into the upper part of the preheater. In this instance, organic chlorine compounds attached to the cement raw materials are to be substantially subjected to thermal decomposition in association with the descent of cement raw materials inside the preheater. Such thermal decomposition does not take place in reality but the organic chlorine compounds are evaporated (separated) due to heat at the upper part of the preheater (including heat of exhaust gas), mixed into the exhaust gas, as they are, and returned to the raw material mill or others. Thereby, the organic chlorine compounds are circulated in raw material processes of cement production and gradually increased in concentration. As a result, an increased quantity of dioxins exhausted from cement production facility are found.

Further, in Patent Document 2, PCB-containing materials delivered from outside the cement production facility (external source) are heated up to 1000° C. or higher and thermally decomposed inside a rotary kiln. However, this method is unable to remove PCBs generated inside cement production facility.

Therefore, the inventor has conducted diligent research to obtain the following findings, with attention focused on causes for generating dioxins and PCBs as organic chlorine compounds (chlorine content) contained in cement raw materials.

First, an adsorbing powder having functions of adsorbing organic chlorine compounds, such as coal fine powder, activated carbon fine powder or coke fine powder (including oil coke fine powder) is used together with fuels, and supplied into exhaust gas generated during calcination, thereby adsorbing organic chlorine compounds such as dioxins and PCBs contained in the exhaust gas on the adsorbing powder. Then, the adsorbing powder for adsorbing organic chlorine compounds is collected, and used as a fuel for calcinating cement raw materials. The organic chlorine compounds are decomposed upon burning the adsorbing powder. Thereby, it is possible to thermally decompose the organic chlorine compounds in heat-treated gas.

Further, a bag filter provided with a filter cloth containing an organic chlorine compound-decomposing catalyst is adopted as a dust collector for collecting an adsorbing powder, and the adsorbing powder is supplied into dust-removed gas which is allowed to pass through an electric dust collector, thereby making it possible to further reduce the quantity of organic chlorine compounds such as dioxins and PCBs exhausted from cement production facility.

Second, a cleaning fluid is sprayed on dust-removed gas, thereby removing organic chlorine compounds contained in the dust-removed gas. Thus, it is possible to reduce the quantity of organic chlorine compounds such as dioxins and PCBs exhausted from cement production facility.

Further, the cleaning fluid, which has absorbed organic chlorine compounds, is supplied to a high temperature part of cement production facility at which the temperature rises up to 800° C. or higher on normal operation. It is, thereby, possible to thermally decompose the organic chlorine compounds in heat-treated gas.

Third, some of the exhaust gas (which contains organic chlorine compounds) generated on calcination of cement clinker is fractionated and supplied to a high temperature part of cement production facility at which the temperature rises up to 800° C. or higher on normal operation. Thereby, it is possible to thermally decompose organic chlorine compounds contained in the exhaust gas.

Further, some of the cement raw materials supplied to the upper part of a preheater are fractionated and supplied to a high temperature part of cement production facility at which the temperature rises up to 800° C. or higher. Thereby, it is possible to thermally decompose organic chlorine compounds contained in cement raw materials.

On the basis of the above-described findings, the inventor conceived the present invention.

An object of the present invention is to provide a method for reducing organic chlorine compounds in cement production facility, which is capable of reducing a quantity of organic chlorine compounds such as dioxins and PCBs exhausted from the cement production facility and also capable of saving fuel for calcinating cement raw materials, and also to provide the cement production facility.

Means for Solving the Problem

The present invention relates to a method for reducing organic chlorine compounds in cement production facility by which a quantity of the organic chlorine compounds contained in cement raw materials is reduced in the cement production facility, and the method for reducing organic chlorine compounds in cement production facility, which is provided with an organic matter adsorbing step in which an adsorbing powder is supplied into exhaust gas generated on calcination of the cement clinker from the cement raw materials, thus adsorbing the organic chlorine compounds on the adsorbing powder, and an adsorbing-powder removing step in which the adsorbing powder, on which organic chlorine compounds are adsorbed, is collected, thereby removing the adsorbing powder from the exhaust gas.

According to the method for reducing organic chlorine compounds in cement production facility of the present invention, an adsorbing powder is supplied into exhaust gas generated on calcination of the cement clinker from cement raw materials, by which the organic chlorine compounds are adsorbed on the adsorbing powder (organic matter adsorbing step). Then, the adsorbing powder, which is allowed to pass through the organic matter adsorbing step, is collected, thereby removing the adsorbing powder from the exhaust gas (adsorbing-powder removing step). Thus, organic chlorine compounds contained in the exhaust gas are removed. As a result, it is possible to reduce the quantity of organic chlorine compounds such as dioxins and PCBs exhausted from the cement production facility to a greater extent compared to conventional facility.

In the method for reducing organic chlorine compounds in cement production facility of the present invention, the adsorbing powder may be at least any one of coal fine powder, activated carbon fine powder or oil coke fine powder. There is no particular limitation on the adsorbing powder as long as it is powder capable of adsorbing organic chlorine compounds such as dioxins and PCBs in exhaust gas. However, porous powder high in adsorption of organic chlorine compounds is preferable.

The greater the amount of adsorbing powder supplied into the exhaust gas, the better the result will be. However, when it is supplied in a quantity of 200 g/m³ or more, an increased load of dust-removing facility is found. Therefore, it is preferable to adopt an adsorbing powder high in BET specific surface area. It is preferable that the adsorbing powder is 0.1 $m^2/g$ in BET specific surface area. Where the BET specific surface area is less than 0.1 $m^2/g$, no practical adsorption performance is obtained. An adsorbing powder high in BET specific surface area is used to adsorb a greater quantity of organic chlorine compounds in a smaller quantity of the adsorbing powder, thus making it possible to reduce the load on a dust collector.

There is no particular limitation on a means for allowing the adsorbing powder to be in contact with exhaust gas. For example, at the halfway point of a piping of high-temperature gas, a feeding port of the adsorbing powder is formed, to which a feeding system of the adsorbing powder may be connected. A screw feeder may be adopted as the feeding system of the adsorbing powder.

There is no particular limitation on a means for collecting dust from exhaust gas. A dust collector such as an electric dust collector or a bag filter may be adopted. Further, all dust collected by the dust collector may be allowed to be in contact with the high-temperature gas or only some of the dust may be allowed to be in contact with the high-temperature gas.

In the method for reducing organic chlorine compounds in cement production facility of the present invention, an adsorbing powder, which has adsorbed the organic chlorine compounds, may be used as a fuel on calcination of the cement clinker, and the adsorbing powder is burnt, thereby decomposing the organic chlorine compounds. When the adsorbing powder, which has adsorbed organic chlorine compounds, is fed from a fuel feeding port, for example, as a fuel for a burner of a rotary kiln, organic chlorine compounds adsorbed on the adsorbing powder are instantaneously decomposed by the heat resulting from a burner flame (1500° C. or higher).

According to the method for reducing organic chlorine compounds in cement production facility of the present invention, the adsorbing powder, which has adsorbed organic chlorine compounds, is used as a fuel on calcination of the cement clinker, thus making it possible to save fuels necessary for calcination.

There is no limitation on the structure of cement production facility. For example, calcination equipment (such as a rotary kiln) or facility having a preheater, a calcinator, a rotary kiln and others are acceptable. The rotation speed of the rotary kiln is, for example, in the range of 1 to 3 rpm.

A temperature for calcinating cement, for example, that inside a rotary kiln is usually 1100° C. to 1450° C., higher than a temperature (700° C.) at which organic chlorine compounds are thermally decomposed. Therefore, organic chlorine compounds are thermally decomposed and rendered harmless on calcination of the cement clinker.

In a method for reducing organic chlorine compounds in cement production facility of the present invention, dust contained in the exhaust gas is removed and the adsorbing powder may be supplied to the exhaust gas from which the dust has been removed.

According to the method for reducing organic chlorine compounds in cement production facility of the present invention, dust contained in the exhaust gas is removed. A slight quantity of organic chlorine compounds is found in exhaust gas from which dust has been removed, that is, dust-removed gas. Therefore, an adsorbing powder is supplied to the dust-removed gas, by which organic chlorine compounds contained in the dust-removed gas are adsorbed on the adsorbing powder. Further, the adsorbing powder, which has adsorbed organic chlorine compounds, is collected to remove the adsorbing powder from the dust-removed gas. Thereby, it is possible to reduce the quantity of organic chlorine compounds such as dioxins and PCBs exhausted from the cement production facility to a greater extent compared to conventional facility.

The present invention relates to a method for reducing organic chlorine compounds in cement production facility by which a quantity of the organic chlorine compounds contained in cement raw materials is reduced in the cement production facility, and a method which is provided with an organic matter absorbing step in which exhaust gas generated on calcination of the cement clinker from the cement raw materials is allowed to be in contact with a cleaning fluid and the organic chlorine compounds are allowed to be absorbed by the cleaning fluid and a recovery step in which the cleaning fluid, which has absorbed the organic chlorine compounds, is recovered to remove the organic chlorine compounds from the exhaust gas.

According to the method for reducing organic chlorine compounds in cement production facility of the present invention, exhaust gas generated upon calcination of the cement clinker from cement raw materials is allowed to be in contact with a cleaning fluid, by which organic chlorine compounds are absorbed by the cleaning fluid (organic matter absorbing step). Then, the cleaning fluid, which has passed through the organic matter absorbing step, is recovered, by which organic chlorine compounds are removed from the exhaust gas (cleaning fluid recovery step). Thereby, it is possible to reduce the quantity of organic chlorine compounds such as dioxins and PCBs exhausted from the cement production facility to a greater extent compared to conventional facility.

In the method for reducing organic chlorine compounds in cement production facility of the present invention, dust contained in the exhaust gas may be collected and the exhaust gas from which the dust has been removed is allowed to be in contact with a cleaning fluid.

According to the method for reducing organic chlorine compounds in cement production facility of the present invention, dust contained in the exhaust gas is removed. A slight quantity of organic chlorine compounds is found in exhaust gas from which dust has been removed, that is, dust-removed gas. Therefore, the dust-removed gas is allowed to be in contact with a cleaning fluid, by which organic chlorine compounds contained in the dust-removed gas are absorbed by the cleaning fluid. Further, the cleaning fluid, which has absorbed organic chlorine compounds, is recovered to remove the organic chlorine compounds from the dust-removed gas. Thereby, it is possible to reduce the quantity of organic chlorine compounds such as dioxins and PCBs exhausted from the cement production facility to a greater extent compared to conventional facility.

There is no limitation on the means for collecting dust from the exhaust gas. A dust collector such as an electric dust collector or a bag filter may be adopted. Further, all dust collected by the dust collector may be allowed to be in contact with a cleaning fluid or only some of the dust may be allowed to be in contact with the cleaning fluid.

In the method for reducing organic chlorine compounds in cement production facility of the present invention, the cleaning fluid may be oil or a mixture made up of oil and water. Oil that is high in boiling point and difficult in evaporation, for example, light oil and soybean oil is preferable. Further, an oil portion in the mixture of oil and water may be oil that has a high boiling point and is difficult to evaporate, as described above. A water portion in the mixture of oil and water is preferably a basic aqueous solution (an aqueous solution containing alkaline metals, hydroxides of alkali earth metals or amines). This is because hydrogen chloride and sulfur oxides contained in dust-removed gas can be easily adsorbed (absorbed) and removed. Tap water may also be used as the water portion.

The ratio of the oil portion to the water portion in the cleaning fluid is in the range of 100:0 to 20:80. Where the ratio of the water portion exceeds 80%, organic chlorine compounds are removed less effectively. A preferable ratio of the oil portion to the water portion is from 100:0 to 50:50. Where the ratio is in the above range, organic chlorine compounds can be removed effectively.

There is no limitation on the method for allowing a cleaning fluid to be in contact with dust-removed gas. For example, the cleaning fluid may be sprayed on the dust-removed gas, or the dust-removed gas may be subjected to bubbling in the cleaning fluid stored in a tank. Where the spray method is adopted, the cleaning fluid can be used in a reduced quantity. Where the bubbling method is adopted, organic chlorine compounds in the cleaned gas can be removed at a higher rate compared to the spray of a cleaning fluid. This is because the cleaning fluid can be in contact with the dust-removed gas for a longer period of time.

A scrubber or the like may be adopted by which a cleaning fluid is sprayed on the dust-removed gas from a nozzle in an atomized manner as a means for spraying the cleaning fluid.

A cleaning fluid is sprayed on the dust-removed gas preferably in a quantity from 0.1 to 1000 L/m$^3$ and more preferably from 0.5 to 1.0 L/m$^3$. Where the cleaning fluid is in the above-described quantity, an exhausted quantity of organic chlorine compounds can be reduced effectively even in a reduced quantity. In the case of a quantity less than 0.1 L/m$^3$, an exhausted quantity of organic chlorine compounds is reduced less effectively. Further, in the case of a quantity exceeding 1000 L/m$^3$, a pump with a greater power is needed.

In the method for reducing organic chlorine compounds in cement production facility of the present invention, the cleaning fluid, which has absorbed the organic chlorine compounds, may be supplied to a high temperature part of the cement production facility, thereby thermally decomposing the organic chlorine compounds contained in the cleaning fluid. The cleaning fluid is supplied to the high temperature part of the cement production facility, by which organic chlorine compounds absorbed by the cleaning fluid are thermally decomposed. As a result, it is possible to reduce the quantity of organic chlorine compounds such as dioxins and PCBs exhausted from the cement production facility to a greater extent compared to conventional facility.

The temperature of calcinating cement, for example, that inside a rotary kiln (usually 1100° C. to 1450° C.), is higher than the temperature (700° C.) at which organic chlorine compounds are thermally decomposed. Therefore, organic chlorine compounds are thermally decomposed and rendered harmless on calcination of the cement clinker.

In the method for reducing organic chlorine compounds in cement production facility of the present invention, the temperature of the cement production facility at normal operation is preferably 800° C. or higher and more preferably 850° C. or higher. Where the temperature is in the above range, it is possible to attain a complete thermal decomposition of organic chlorine compounds such as dioxins. Where the temperature at the high temperature part is less than 800° C., it is impossible to attain a complete thermal decomposition of organic chlorine compounds such as dioxins.

In the method for reducing organic chlorine compounds in cement production facility of the present invention, the cement production facility may be calcination equipment (for example, a rotary kiln) or facility having a preheater, a calcinator and a rotary kiln. In this case, high temperature parts include facility at which the temperature exceeds 800° C. or higher at normal operation, for example, the lower stage part of a preheater (850° C.), a calcinator (850° C.), the posterior chamber of a rotary kiln (1000° C.), the anterior chamber of the rotary kiln (maximum temperature of 1450° C.), and the high temperature part of a clinker cooler (800° C. or higher). A cleaning fluid, which has absorbed organic chlorine compounds, may be all fed into one of these facility or an absorbing liquid may be fed at a predetermined portion to a plurality of the facility or all the facility. It is noted that the high temperature part of a clinker cooler is, for example, the upstream part of a clinker cooler into which cement clinker is fed from a rotary kiln.

For example, where a cleaning fluid is fed only to a rotary kiln, the cleaning fluid, which has absorbed organic chlorine compounds, is to be fed into high temperature parts in a quantity of 10 tons or lower per hour in a dry-type kiln with the production of cement clinker of 100 tons per hour. In other words, it is preferable to feed the cleaning fluid in the ratio of 1:10 or lower with respect to cement clinker to be produced on a weight basis. Where the cleaning fluid, which has absorbed organic chlorine compounds, is added to cement raw materials at more than 10 percent by weight, an insufficient calcination reaction takes place at a rotary kiln to result in a concern that the quality of the cement clinker may be affected.

The time necessary for a rotary kiln to effect calcination (raw material retaining time=thermal decomposition time of organic chlorine compounds) is 30 to 60 minutes. Organic chlorine compounds are thermally decomposed by several seconds of heating, for example, at a temperature of 900° C. or lower.

In the method for reducing organic chlorine compounds in cement production facility of the present invention, the cleaning fluid, which has absorbed the organic chlorine compounds, is fed from a fuel feeding port, for example, as a fuel for a burner of a rotary kiln, by which organic chlorine compounds contained in the cleaning fluid will be decomposed instantaneously by the heat resulting from a burner flame (1500° C. or higher).

In the method for reducing organic chlorine compounds in cement production facility of the present invention, the exhaust gas from which the dust has been removed may be allowed to be again in contact with the cleaning fluid, which has absorbed the organic chlorine compounds. Reuse of the cleaning fluid makes a reduction in the running costs of cleaning equipment possible.

The present invention relates to a method for reducing organic chlorine compounds in cement production facility by which a quantity of the organic chlorine compounds contained in cement raw materials is reduced in the cement production facility, and the method which is provided with a thermal decomposition step in which exhaust gas generated on calcination of the cement clinker from the cement raw materials is supplied to a high temperature part of cement production facility, thereby thermally decomposing the organic chlorine compounds contained in the exhaust gas.

According to the method for reducing organic chlorine compounds in cement production facility of the present invention, exhaust gas generated on calcination of the cement clinker from cement raw materials is supplied to a high temperature part of the cement production facility, thereby thermally decomposing organic chlorine compounds contained in the exhaust gas (thermal decomposition step). Therefore, circulation of organic chlorine compounds is cut off in raw material processes of cement production, inhibiting the above-mentioned increase in concentration of the organic chlorine compounds. As a result, it is possible to reduce the quantity of organic chlorine compounds such as dioxins and PCBs exhausted from the cement production facility to a greater extent compared to conventional facility.

Organic chlorine compounds such as dioxins and PCBs are found in an evaporated state in exhaust gas or attached to dust in the exhaust gas. Separation of dioxins from dust requires heating of the dust up to 100° C. or higher, and decomposition of dioxins in the exhaust gas requires heating of the exhaust gas up to 800° C. or higher. Further, separation of PCBs from dust requires heating of the dust up to 100° C. or higher and decomposition of PCBs requires heating of the exhaust gas up to 800° C. or higher.

In the method for reducing organic chlorine compounds in cement production facility of the present invention, the temperature of the cement production facility at normal operation is preferably 800° C. or higher and more preferably 850° C. or higher. Where the temperature is in the above range, it is possible to thermally decompose organic chlorine compounds such as dioxins completely. Where the temperature at a high temperature part is less than 800° C., it is impossible to attain a complete thermal decomposition of organic chlorine compounds such as dioxins.

In the method for reducing organic chlorine compounds in cement production facility of the present invention, the cement production facility may be calcination equipment (for example, a rotary kiln) or facility having a preheater, a calcinator and a rotary kiln. In this instance, high temperature parts include facility at which the temperature exceeds 800° C. or higher at normal operation, for example, the lower stage part of a preheater (850° C.), a calcinator (850° C.), the posterior chamber of a rotary kiln (1000° C.), the anterior chamber of the rotary kiln (maximum temperature of 1450° C.), the high temperature part of a clinker cooler (800° C. or higher). Exhaust gas may be all fed into one of these facility or the exhaust gas may be fed at a predetermined portion to a plurality of the facility or all the facility. It is noted that the high temperature part of a clinker cooler is, for example, the upstream part of a clinker cooler into which cement clinker is fed from a rotary kiln.

It is preferable to supply exhaust gas to the high temperature part of cement production facility in a quantity of 5% to 10% with respect to a total quantity of the exhaust gas. Where the quantity is less than 5%, organic chlorine compounds are not effectively decomposed. Where the quantity exceeds 10%, cement production is seriously affected due to energy loss.

The present invention relates to a method for reducing organic chlorine compounds in cement production facility by which a quantity of the organic chlorine compounds contained in cement raw materials is reduced in the cement production facility, and the method which is provided with a thermal decomposition step in which the cement raw materials are supplied to the high temperature part of the cement production facility, thereby thermally decomposing the organic chlorine compounds contained in cement raw materials.

According to the method for reducing organic chlorine compounds in cement production facility of the present invention, cement raw materials are supplied to a high temperature part of the cement production facility, thereby thermally decomposing organic chlorine compounds contained in cement raw materials (thermal decomposition step). Thereby, circulation of organic chlorine compounds is cut off in raw material processes of cement production, inhibiting the above-mentioned increase in concentration of the organic chlorine compounds. As a result, it is possible to reduce the quantity of organic chlorine compounds such as dioxins and PCBs exhausted from the cement production facility to a greater extent compared to conventional facility.

In the method for reducing organic chlorine compounds in cement production facility of the present invention, the cement production facility may be calcination equipment (for example, a rotary kiln) or facility having a preheater, a calcinator and a rotary kiln. In this instance, the high temperature parts include, for example, the lower stage part of a preheater (850° C.).

It is preferable to supply cement raw materials to a high temperature part of cement production facility in a quantity of 10% or less with respect to a total quantity of the cement raw materials to be fed into a preheater. Where the quantity exceeds 10%, cement production facility are affected for the stability of operation.

Cement raw materials supplied to a high temperature part of cement production facility may be divided and taken from a storage silo where the raw materials are crushed by a raw material mill and stored, or may be divided and taken at a halfway point of raw material powder transport facility for supplying the cement raw materials to a preheater from the storage silo.

The present invention relates to cement production facility for calcinating cement clinker from cement raw materials, which are provided with a collecting means for collecting an adsorbing powder supplied into exhaust gas generated on calcination of the cement clinker and an adsorbing-powder supply channel for supplying the adsorbing powder collected by the collecting means to the anterior chamber of a rotary kiln for calcinating the cement clinker.

According to the cement production facility of the present invention, an adsorbing powder is supplied to exhaust gas generated on calcination of the cement clinker from cement raw materials and the adsorbing powder, which has adsorbed organic chlorine compounds, is collected to remove the adsorbing powder from the exhaust gas. Then, the thus collected adsorbing powder is supplied to the anterior chamber of a rotary kiln, thereby thermally decomposing organic chlorine compounds adsorbed by the adsorbing powder. Thus, it is possible to reduce the quantity of organic chlorine compounds such as dioxins and PCBs exhausted from the cement production facility to a greater extent compared to conventional facility.

In the cement production facility of the present invention, the collecting means may be a bag filter equipped with a filter cloth containing an organic chlorine compound-decomposing catalyst. Organic chlorine compounds adsorbed by the adsorbing powder are collected by the filter cloth, subjected to chemical decomposition in contact with the organic chlorine compound-decomposing catalyst and rendered harmless.

The filter cloth containing an organic chlorine compound-decomposing catalyst includes, for example, Remedia (trade name) made by Japan Gore-Tex Inc. When Remedia is used, the organic chlorine compound-decomposing catalyst works most effectively at 210° C. to 230° C.

The cement production facility of the present invention may be provided with a dust collector for collecting dust contained in the exhaust gas before the exhaust gas passes through the collecting means.

According to the cement production facility of the present invention, since organic chlorine compounds are contained also in the dust, it is possible to reduce the quantity of organic chlorine compounds such as dioxins and PCBs exhausted from the cement production facility to a greater extent compared to conventional facility by removing dust contained in the exhaust gas. Further, dust contained in the exhaust gas is collected before passage through the collecting means, thus making it possible to prevent clogging of the collecting means.

The present invention relates to the cement production facility for calcinating cement clinker from cement raw materials, which are provided with a cleaning fluid spray means for spraying a cleaning fluid into exhaust gas generated on calcination of the cement clinker and a recovery tank for recovering the cleaning fluid in contact with the exhaust gas.

The cement production facility of the present invention may be provided with a cleaning fluid supply channel for supplying the cleaning fluid recovered in the recovery tank to a high temperature part of the cement production facility. Further, the high temperature part may be at least one of the lower stage part of a preheater and the anterior chamber of a rotary kiln.

According to the cement production facility of the present invention, exhaust gas generated on calcination of the cement clinker from cement raw materials is allowed to be in contact with a cleaning fluid, by which organic chlorine compounds are absorbed by the cleaning fluid. Then, the cleaning fluid, which has passed through an organic matter absorbing step, is collected to remove organic chlorine compounds from the exhaust gas. Thereby, it is possible to reduce the quantity of organic chlorine compounds such as dioxins and PCBs exhausted from the cement production facility to a greater extent compared to conventional facility.

The present invention relates to the cement production facility for calcinating cement clinker from cement raw materials, which are provided with an exhaust gas supply channel for supplying exhaust gas generated on calcination of the cement clinker to a high temperature part of the cement production facility.

In the cement production facility of the present invention, the high temperature part may be at least one of the lower stage part of a preheater and the upstream part of a clinker cooler.

According to the cement production facility of the present invention, exhaust gas generated on calcination of the cement clinker from cement raw materials is supplied to a high temperature part of the cement production facility, thereby thermally decomposing organic chlorine compounds contained in the exhaust gas. Therefore, circulation of organic chlorine compounds is cut off in raw material processes of cement production, inhibiting the above-mentioned increase in concentration of the organic chlorine compounds. As a result, it is possible to reduce the quantity of organic chlorine compounds such as dioxins and PCBs exhausted from the cement production facility to a greater extent compared to conventional facility.

The present invention relates to the cement production facility for calcinating cement clinker from cement raw materials, which are provided with a cement raw material supply channel for supplying the cement raw materials to a high temperature part of the cement production facility.

In the cement production facility of the present invention, the high temperature part may be the lower stage part of a preheater.

According to the method for reducing organic chlorine compounds in the cement production facility of the present invention, cement raw materials are supplied to a high temperature part of the cement production facility, thereby thermally decomposing the organic chlorine compounds contained in cement raw materials. Therefore, circulation of organic chlorine compounds is cut off in raw material processes of cement production, inhibiting the above-mentioned increase in concentration of the organic chlorine compounds.

As a result, it is possible to reduce the quantity of organic chlorine compounds such as dioxins and PCBs exhausted from the cement production facility to a greater extent compared to conventional facility.

Advantageous Effects of the Invention

According to the present invention, an adsorbing powder is supplied into exhaust gas generated on calcination of the cement clinker from cement raw materials, by which organic chlorine compounds are adsorbed on the adsorbing powder. Then, the adsorbing powder, which has adsorbed the organic chlorine compounds, is collected to remove the adsorbing powder from the exhaust gas. Thereby, organic chlorine compounds contained in the exhaust gas are removed. As a result, it is possible to reduce the quantity of organic chlorine compounds such as dioxins and PCBs exhausted from the cement production facility to a greater extent compared to conventional facility.

According to the present invention, the adsorbing powder, which has adsorbed organic chlorine compounds, is used as a fuel for calcinating cement clinker, thus making it possible to save fuels for calcination.

According to the present invention, exhaust gas generated on calcination of the cement clinker from cement raw materials is allowed to be in contact with a cleaning fluid, thereby absorbing the organic chlorine compounds by the cleaning fluid. Then, the cleaning fluid, which has absorbed the organic chlorine compounds, is collected to remove organic chlorine compounds from the exhaust gas. Thereby, it is possible to reduce the quantity of organic chlorine compounds such as dioxins and PCBs exhausted from the cement production facility to a greater extent compared to conventional facility.

According to the present invention, the cleaning fluid, which has absorbed the organic chlorine compounds, is supplied to a high temperature part of the cement production facility, thereby thermally decomposing the organic chlorine compounds absorbed by the cleaning fluid. As a result, it is possible to reduce the quantity of organic chlorine compounds such as dioxins and PCBs exhausted from the cement production facility to a greater extent compared to conventional facility.

According to the present invention, exhaust gas generated on calcination of the cement clinker from cement raw materials is supplied to a high temperature part of the cement production facility, thereby thermally decomposing organic chlorine compounds contained in the exhaust gas. Alternatively, cement raw materials are supplied to a high temperature part of the cement production facility, thereby thermally decomposing the organic chlorine compounds contained in cement raw materials. Therefore, circulation of organic chlorine compounds is cut off in raw material processes of cement production, inhibiting the above-mentioned increase in concentration of the organic chlorine compounds. As a result, it is possible to reduce the quantity of organic chlorine compounds such as dioxins and PCBs exhausted from the cement production facility to a greater extent compared to conventional facility.

DESCRIPTION OF SYMBOLS

Figure 1:
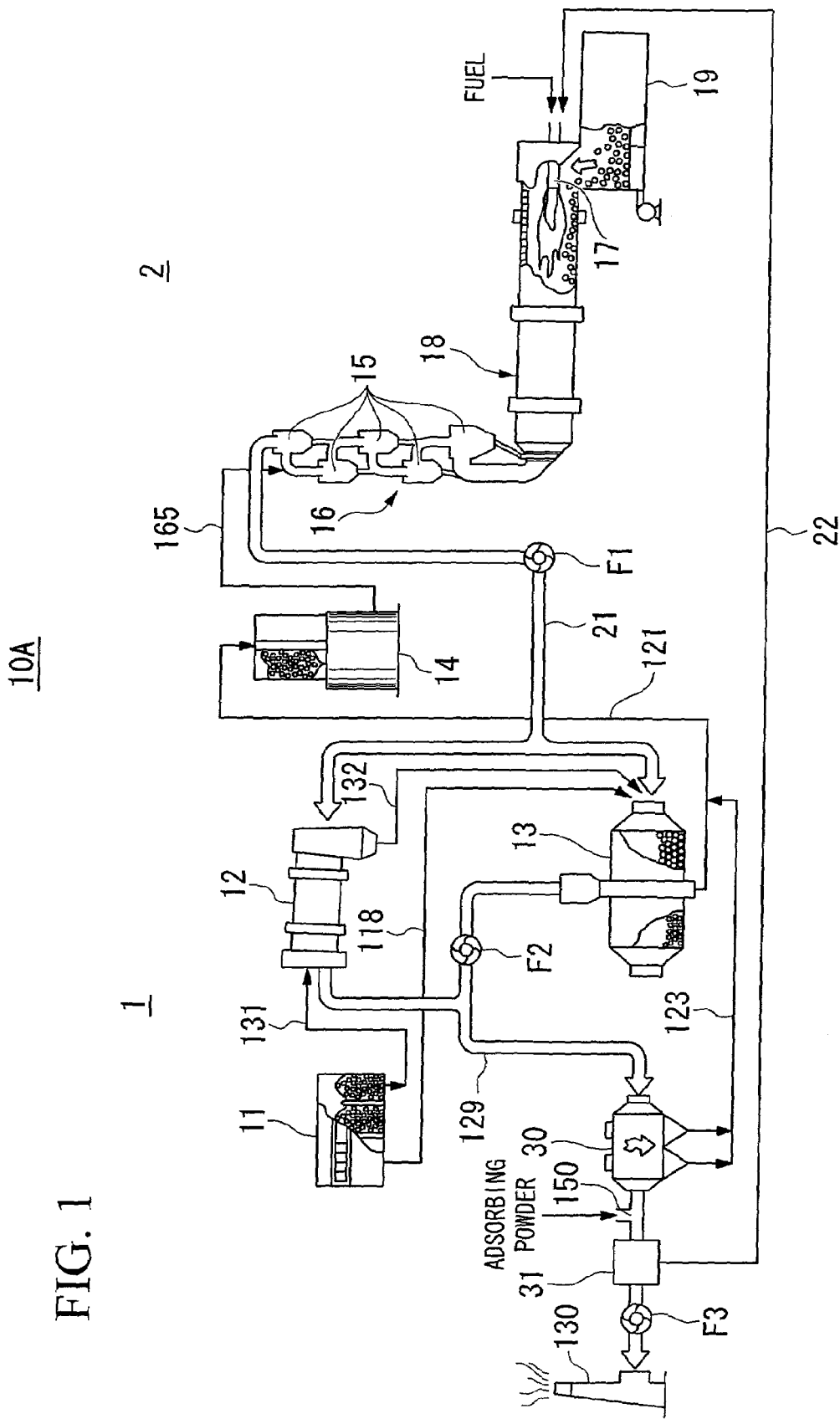
FIG. 1 is a schematic configuration diagram of cement production facility for carrying out Embodiment 1 of the method of the present invention for reducing organic chlorine compounds.

1: Raw material processing area
2: Calcination processing area
10A, 10Bm 10C, 10D: Cement production facility
11: Raw material storage shed
12: Raw material dryer
13: Raw material mill
14: Storage silo
16: Preheater
18: Rotary kiln
19: Clinker cooler
23: Cleaning fluid spraying system
30: Electric dust collector
31: Bag filter

BEST MODE FOR CARRYING OUT THE INVENTION

A description will be given of a method for reducing organic chlorine compounds in the cement production facility of the present invention and Embodiment 1 of the cement production facility by referring FIG. 1 and FIG. 2.

As illustrated in FIG. 1, the cement production facility 10A of the present embodiment are provided with a raw material processing area 1 for crushing cement raw materials and a calcination processing area 2 for calcinating the thus crushed cement raw materials.

The raw material processing area 1 is provided with a raw material storage shed 11, a raw material dryer 12, a raw material mill 13, a storage silo 14, an electric dust collector 30 and a bag filter (dust collecting means) 31. The raw material storage shed 11 individually stores limestone, clay, silica stone and iron material as cement raw materials. The raw material dryer 12 heats cement raw materials high in water content and dries them. The raw material mill 13 crushes the cement raw materials supplied from the raw material storage shed 11. The storage silo 14 stores the cement raw materials crushed by the raw material mill 13. The electric dust collector 30 collects dust (powder) contained in the organic chlorine compounds such as dioxins and PCBs in exhaust gas from the raw material dryer 12 and the raw material mill 13. The bag filter 31 decomposes organic chlorine compounds contained in an adsorbing powder by decomposition action of a catalyst to render the adsorbing powder harmless.

The raw material storage shed 11 is connected to the raw material mill 13 via raw material transfer facility 118 and also connected to the raw material dryer 12 via raw material supply facility 131. The raw material dryer 12 is connected to the raw material mill 13 via dried raw material discharge facility 132. The raw material mill 13 is connected to the storage silo 14 via crushed raw material transfer facility 121. Cement raw materials stored at the raw material storage shed 11 are fed into the raw material mill 13 via raw material transfer facility 118. However, some of the cement raw materials high in water content such as clay are fed into the raw material dryer 12 via the raw material supply facility 131.

The upper part of a preheater 16 to be described later is connected to the raw material dryer 12 and the raw material mill 13 via an exhaust gas duct 21. The exhaust gas duct 21 is branched at the downstream end into two directions, with one downstream end connected to the raw material dryer 12, and the other downstream end connected to the raw material mill 13. The exhaust gas duct 21 is provided with a fan F1 for transferring exhaust gas. Exhaust gas from the upper part of the preheater 16 at 300° C. or higher is introduced via the exhaust gas duct 21 to the raw material dryer 12 and the raw material mill 13. Upon introduction of the exhaust gas, the temperature inside the raw material dryer 12 will be about 300° C., and that inside the raw material mill 13 will be 100° C. or higher.

Cement raw materials high in water content and fed into the raw material dryer 12 are dried by the heat of exhaust gas introduced via the exhaust gas duct 21, and thereafter fed into the raw material mill 13 via dried raw material discharge facility 132.

A number of metal balls are accommodated in a rotating drum of the raw material mill 13. When cement raw materials are continuously fed into the rotating drum, with the rotating drum being rotated, cement raw materials are finely crushed by these metal balls, thus obtaining powder of cement raw materials crushed into grains of about 90 μm or smaller. The thus crushed cement raw materials are fed into the storage silo 14 via crushed raw material transfer facility 121.

The raw material dryer 12 and the raw material mill 13 are connected to a chimney 130 via the gas duct 129. The gas duct 129 is branched at the upstream end into two directions, with one upstream end connected to the raw material dryer 12 and the other upstream end connected to the raw material mill 13. The electric dust collector 30 is installed at the gas duct 129, which is further downstream compared to the branched portion. The bag filter 31 is installed at the gas duct 129, which is further downstream compared the electric dust collector 30. A fan F2 is installed at the gas duct 129 connected to the raw material mill 13, and a fan F3 is installed at the gas duct 129 between the bag filter 31 and the chimney 130. A feeding port 150 is installed at the gas duct 129 between the electric dust collector 30 and the bag filter 31. An adsorbing powder, which adsorbs organic chlorine compounds contained in the exhaust gas generated on calcination of cement raw materials, that is, exhaust gas from the upper stage part of the preheater 16, is fed into the feeding port 150. The exhaust gas used in heating the raw material dryer 12 and the raw material mill 13 is released into the atmosphere via the gas duct 129 and the chimney 130.

The adsorbing powder includes coal fine powder with the grain size of 20 μm to 70 μm. This coal fine powder is also used as a fuel for obtaining cement clinker through calcination of cement raw materials. The adsorbing powder is fed from the feeding port 150 in a quantity of about 100 g with respect to 1 m$^3$ of exhaust gas. It is noted that activated carbon fine powder with a grain size of about 10 μm to 100 μm may be used in place of the coal fine powder.

The electric dust collector 30 is connected to a halfway point of the crushed raw material transfer facility 121 via a dust delivery pipe 123. Dust collected by the electric dust collector 30 is fed into the storage silo 14 via the dust delivery pipe 123 and the crushed raw material transfer facility 121.

Figure 2:
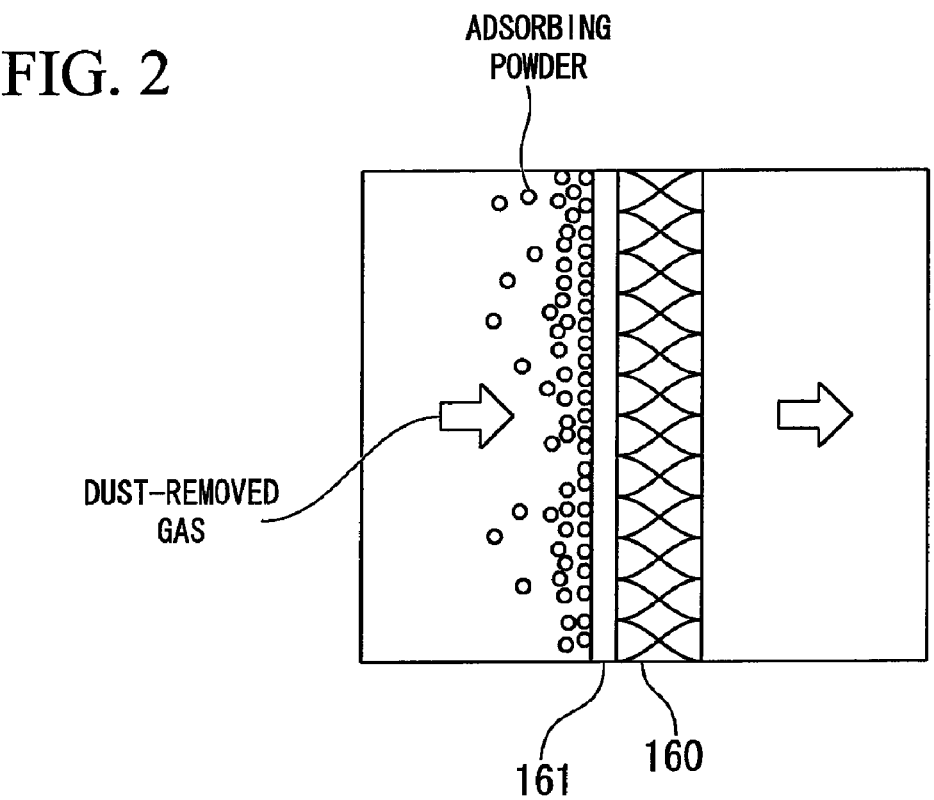
FIG. 2 is a schematic configuration diagram of a bag filter mounted on the cement production facility of FIG. 1.

As illustrated in FIG. 2, the bag filter 31 is provided with a bag-like filter cloth 160 on which an organic chlorine compound-decomposing catalyst is attached. The filter cloth 160 is felt made with stretched polytetrafluoroethylene (PTFE) fibers. A membrane filter 161 of a predetermined thickness is laminated on one side face of the filter cloth 160. The above-described catalyst is impregnated into the membrane filter 161. The organic chlorine compound-decomposing catalyst includes titanium-vanadium based catalysts.

When an adsorbing powder is attached to the filter cloth 160, organic chlorine compounds contained in the adsorbing powder are in contact with the catalyst and decomposed by decomposition action of the catalyst. Thereby, the adsorbing powder is rendered harmless. The bag filter 31 is 24 m$^2$ in filtration area, 1.15 m per minute in maximum filtration speed and able to treat an air quantity of 1120 m$^3$N per hour when the internal temperature is at 220° C.

The bag filter 31 is connected to the anterior chamber of a rotary kiln 18 via an adsorbing-powder delivery pipe 22. The adsorbing powder rendered harmless by the bag filter 31 is supplied to a fuel feeding port of a burner 17 installed at the anterior chamber of the rotary kiln 18 via the adsorbing-powder delivery pipe 22.

The storage silo 14 is connected to the upper part of a preheater 16 via heated raw material powder transfer facility 165. Cement raw materials stored at the storage silo 14 are supplied to the upper stage part of the preheater 16 via the heated raw material powder transfer facility 165.

The calcination processing area 2 is provided with a preheater 16, a burner 17, a rotary kiln 18, a clinker cooler 19 and a clinker silo (not illustrated). The preheater 16 preheats cement raw materials so that the cement raw materials can be easily calcinated subsequently in the rotary kiln 18. The lower stage part of the preheater 16 is connected to the posterior chamber of the rotary kiln 18. The rotary kiln 18 heats cement raw materials by way of the burner 17 for calcination, thereby obtaining cement clinker. The clinker cooler 19 cools the cement clinker discharged from the anterior chamber of the rotary kiln 18. The clinker silo stores the cement clinker obtained in the rotary kiln 18.

The preheater 16 is provided with a cyclone 15 consisting of five stages in a vertical direction, the inside of which is kept higher in temperature at a lower stage (downstream). The upstream end of an exhaust gas duct 21 is connected to the upper part of a preheater 16. During a sequential passage of cement raw materials from the upper stage to the lower stage of the cyclone 15, the cement raw materials are preheated until limestone in the cement raw materials is decarbonated (the temperature reaches about 850° C. at the lower stage part of the preheater 16 on normal operation).

The rotary kiln 18 is provided with a kiln shell on which a refractory material is lined, and able to produce cement clinker in a quantity of 100 tons per hour. At the anterior chamber of the rotary kiln 18, cement clinker is calcinated from cement raw materials by the heat of a burner 17 which uses heavy oil or fine powder coal as a fuel.

A description will be given of a method for reducing organic chlorine compounds, which is conducted inside the cement production facility 10A (within the system) of the present embodiment.

First, as illustrated in FIG. 1, cement raw materials (limestone, clay, silica stone and iron material) stored at the raw material storage shed 11 are fed into the raw material mill 13 via raw material transfer facility 118. However, some of the cement raw materials that are high in water content such as clay are fed into a raw material dryer 12 via raw material supply facility 131 and dried by the raw material dryer 12, and thereafter fed into the raw material mill 13 via dried raw material discharge facility 132. Since high-temperature exhaust gas from the upper part of the preheater 16 is introduced via an exhaust gas duct 21 into the raw material dryer 12 and the raw material mill 13, the raw material dryer 12 and the raw material mill 13 are kept thereinside respectively at about 300° C. or higher and 100° C. or higher. Therefore, in the raw material mill 13, cement raw materials containing dried clay supplied from the raw material dryer 12 are heated up to about 100° C. and also crushed by a number of metal balls into pieces with a grain size of about 90 μm or smaller. The thus crushed cement raw materials are fed into the storage silo 14 via crushed raw material transfer facility 121.

Where organic chlorine compounds such as dioxins and PCBs or waste containing organic matter and chlorine (municipal waste and incinerated ash) are included in cement raw materials, organic chlorine compounds contained in cement raw materials, which are fed into the raw material mill 13, are heated inside the raw material mill 13 kept at about 100° C. or higher and are consequently separated from the cement raw materials. Further, organic chlorine compounds contained in cement raw materials, which are fed into the raw material dryer 12, are heated inside the raw material dryer 12 kept at about 300° C. or higher and decomposed (evaporated).

Since exhaust gas introduced into the raw material dryer 12 and the raw material mill 13 is deprived of heat by heating cement raw materials, the exhaust gas at the entrance of an electric dust collector 30 is decreased in temperature to about 90° C. Organic chlorine compounds separated or decomposed from the cement raw materials are substantially adsorbed by dust in the exhaust gas. Dust, which has adsorbed the organic chlorine compounds, is collected by the electric dust collector 30 in the course of being guided into the chimney 130 via the gas duct 129. The thus collected dust is fed into the storage silo 14 via the dust delivery pipe 123 and the crushed raw material transfer facility 121.

An adsorbing powder (coal fine powder) is fed into the gas duct 129 via a feeding port 150. The thus fed adsorbing powder is in contact with dust-removed gas, which has passed through the electric dust collector 30, thereby adsorbing organic chlorine compounds such as dioxins and PCBs contained in the dust-removed gas. The adsorbing powder, which has adsorbed organic chlorine compounds, flows into the bag filter 31 together with the dust-removed gas, and only the adsorbing powder is adsorbed on a membrane filter 161 of a filter cloth 160 while the dust-removed gas passes through the filter cloth 160. Upon attachment of the adsorbing powder on the membrane filter 161, organic chlorine compounds contained in the adsorbing powder are in contact with an organic chlorine compound-decomposing catalyst, and the organic chlorine compounds are decomposed by decomposition action of the catalyst. Thereby, the adsorbing powder is rendered harmless. The adsorbing powder rendered harmless by the bag filter 31 is supplied via an adsorbing-powder delivery pipe 22 to a fuel feeding port of the burner 17. The dust-removed gas, which has passed through the bag filter 31, is released into the atmosphere via the gas duct 129 and the chimney 130.

Cement raw materials (including dust) stored at the storage silo 14 are supplied to the preheater 16 via heated raw material powder transfer facility 165, and heated in the course of flowing down sequentially from the uppermost stage of the cyclone 15 of the preheater 16 to the lower stage of the cyclone 15. Cement raw materials preheated up to about 800° C. by the preheater 16 are fed into the posterior chamber of the rotary kiln 18. At the anterior chamber of the rotary kiln 18, cement clinker is calcinated from cement raw materials by the heat of the burner 17 which burns the adsorbing powder as a part of fuel. In this instance, even when some of the organic chlorine compounds adsorbed on the adsorbing powder remain undecomposed, the adsorbing powder is burnt as a part of fuel of the burner 17, thereby the undecomposed organic chlorine compounds are also thermally decomposed and rendered harmless. The thus calcinated cement clinker is cooled by the clinker cooler 19 and thereafter stored at the clinker silo.

In the cement production facility 10A of the present embodiment, an adsorbing powder is supplied to exhaust gas generated on calcination of the cement clinker from cement raw materials, thereby adsorbing organic chlorine compounds on the adsorbing powder. Then, the adsorbing powder, which has passed through an organic matter adsorbing step, is collected to remove the adsorbing powder from the exhaust gas. Thereby, organic chlorine compounds contained in the exhaust gas are removed. As a result, it is also possible to reduce the quantity of organic chlorine compounds such as dioxins and PCBs exhausted from the cement production facility 10A to a greater extent compared to conventional facility. Further, the adsorbing powder, which has adsorbed organic chlorine compounds, is used as a fuel on calcination of the cement clinker, thus making it possible to save fuels for calcination.

A description will be given of a method for reducing organic chlorine compounds in the cement production facility 10B of the present invention and Embodiment 2 of the cement production facility by referring to FIG. 3. It is noted that constituents already described in Embodiment 1 are given the same symbols or numerals and descriptions thereof are omitted.

Figure 3:
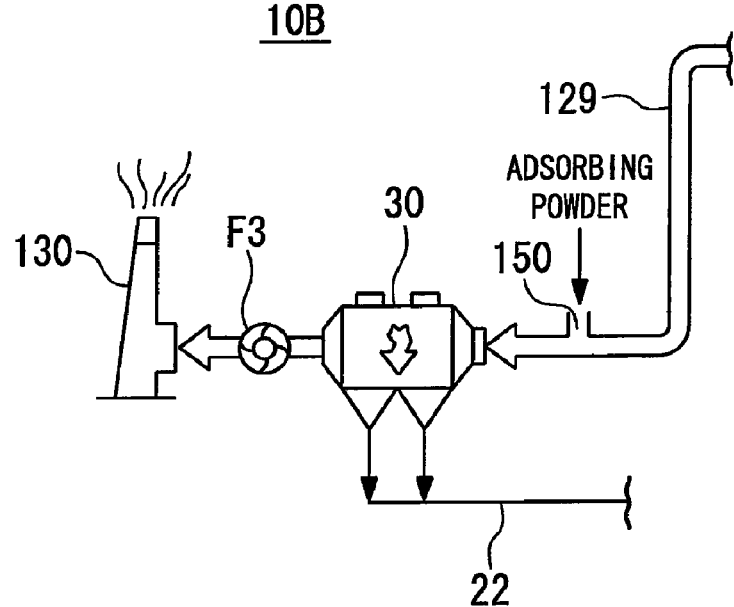
FIG. 3 is a schematic configuration diagram of the cement production facility for carrying out Embodiment 2 of the method of the present invention for reducing organic chlorine compounds.

As illustrated in FIG. 3, in the cement production facility 10B of the present embodiment, a feeding port 150 for an adsorbing powder is installed at a gas duct 129, which is further upstream compared to an electric dust collector 30. Further, the electric dust collector 30 is connected to the fuel feeding port of the burner 17 via the adsorbing-powder delivery pipe 22. Dust and the adsorbing powder collected by the electric dust collector 30 are supplied to the anterior chamber of the rotary kiln 18 via the adsorbing-powder delivery pipe 22. It is noted that no bag filter is installed.

When an adsorbing powder (coal fine powder) is fed into the gas duct 129 via the feeding port 150, the thus fed adsorbing powder is in contact with exhaust gas from the raw material dryer 12 and the raw material mill 13, thereby adsorbing organic chlorine compounds such as dioxins and PCBs contained in the exhaust gas. The adsorbing powder, which has adsorbed organic chlorine compounds, is collected together with dust contained in the exhaust gas by the electric dust collector 30 in the course of being guided into the chimney 130 via the gas duct 129. The thus collected adsorbing powder and dust are supplied to the fuel feeding port of the burner 17 via the adsorbing-powder delivery pipe 22. Dust-removed gas, which has passed through the bag filter 31, is released into the atmosphere via the gas duct 129 and the chimney 130.

In the cement production facility 10A of the present embodiment, an adsorbing powder is supplied into exhaust gas generated on calcination of the cement clinker from cement raw materials, thereby adsorbing organic chlorine compounds on the adsorbing powder. Then, the adsorbing powder, which has passed through an organic matter adsorbing step, is collected to remove the adsorbing powder from the exhaust gas. Thereby, organic chlorine compounds contained in the exhaust gas are removed. As a result, it is also possible to reduce the quantity of organic chlorine compounds such as dioxins and PCBs exhausted from the cement production facility 10A to a greater extent than conventional facility. Further, the adsorbing powder, which has adsorbed organic chlorine compounds, is used as a fuel on calcination of the cement clinker, thus making it possible to save fuels for calcination.

Since other constitutions, actions and effects are the same as those of Embodiment 1, descriptions thereof will be omitted here.

Figure 4:
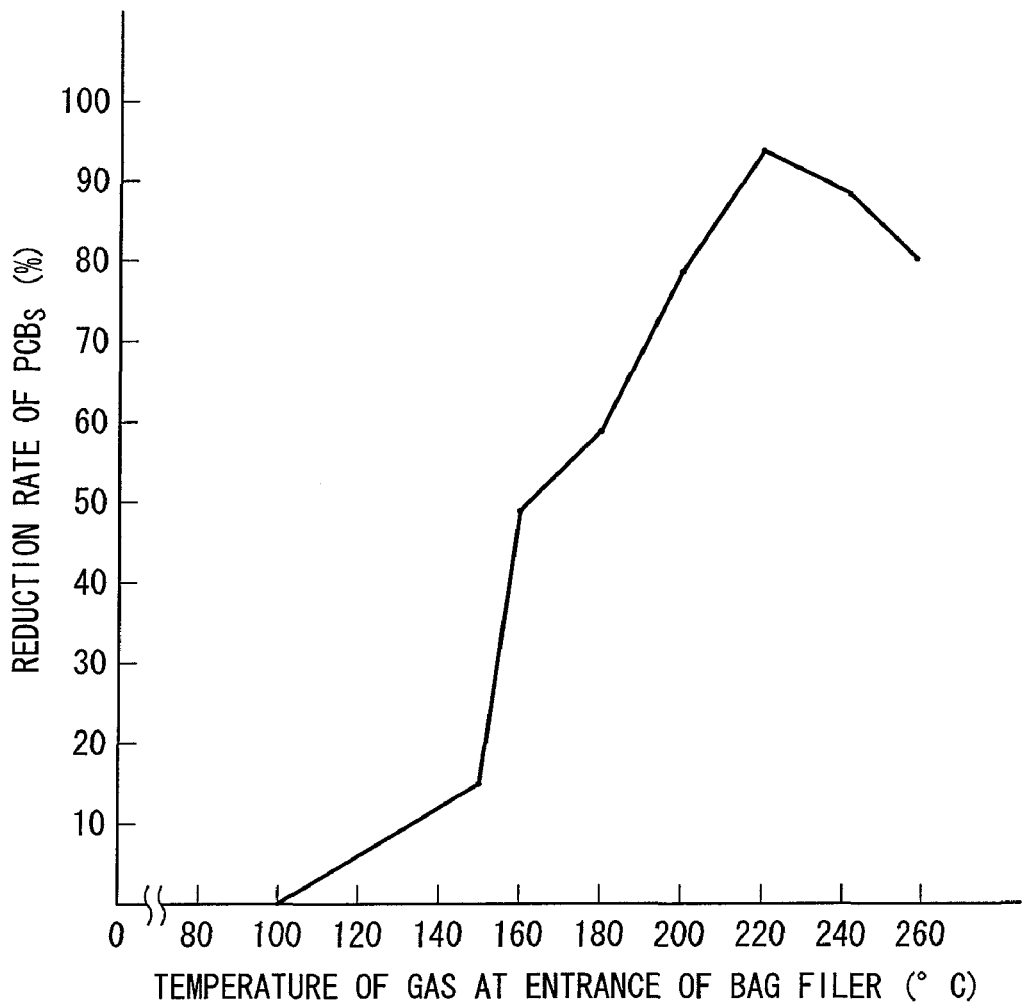
FIG. 4 is a graph illustrating the relationship between temperatures in the vicinity of the entrance of a bag filter mounted on the cement production facility and reduction rates of PCBs.

The cement production facility 10B of the present embodiment were operated to study the relationship between the temperature of exhaust gas at the entrance of a bag filter 31 and the reduction rate of PCBs. Consequently, as illustrated in FIG. 4, the reduction rate of PCBs was found to be higher in a temperature range from 210° C. to 230° C. of the exhaust gas at the entrance of the filter 31 than in other temperature ranges. However, depending on the type of organic chlorine compound-decomposing catalysts, there may be a case where a temperature range at which PCBs are reduced at a higher rate is different from the above-described temperature range.

Apart from the above, a quantity of PCBs in exhaust gas which has passed through the bag filter 31 with respect to a quantity of PCBs in exhaust gas which has passed through the electric dust collector 30, in a case where a bag filter 31 was used which had a filter cloth 160 on which an organic chlorine compound-decomposing catalyst was attached, was compared with a quantity of PCBs in exhaust gas which passed through the bag filter with respect to a quantity of PCBs in exhaust gas which passed through the electric dust collector 30, in a case where a bag filter was used which had a conventional filter cloth free of an organic chlorine compound-decomposing catalyst. As a result, the ratio of (the quantity of PCBs in exhaust gas which passed through the bag filter 31) to (the quantity of PCBs in exhaust gas which passed through the electric dust collector 30) was 0.05. On the other hand, the ratio of (the quantity of PCBs in exhaust gas which passed through the bag filter) to (the quantity of PCBs in exhaust gas which passed through the electric dust collector 30) was 0.12. On the basis of this finding, use of the bag filter 31 having the filter cloth 160 on which an organic chlorine compound-decomposing catalyst was attached was found to reduce a quantity of PCBs more greatly than use of the bag filter having the conventional filter cloth free of an organic chlorine compound-decomposing catalyst.

A description will be given of Embodiment 3 which is a method for reducing organic chlorine compounds in cement production facility of the present invention by referring to FIG. 5 and FIG. 6. It is noted that the constituents already described in Embodiment 1 are given the same symbols and descriptions thereof are omitted.

Figure 5:
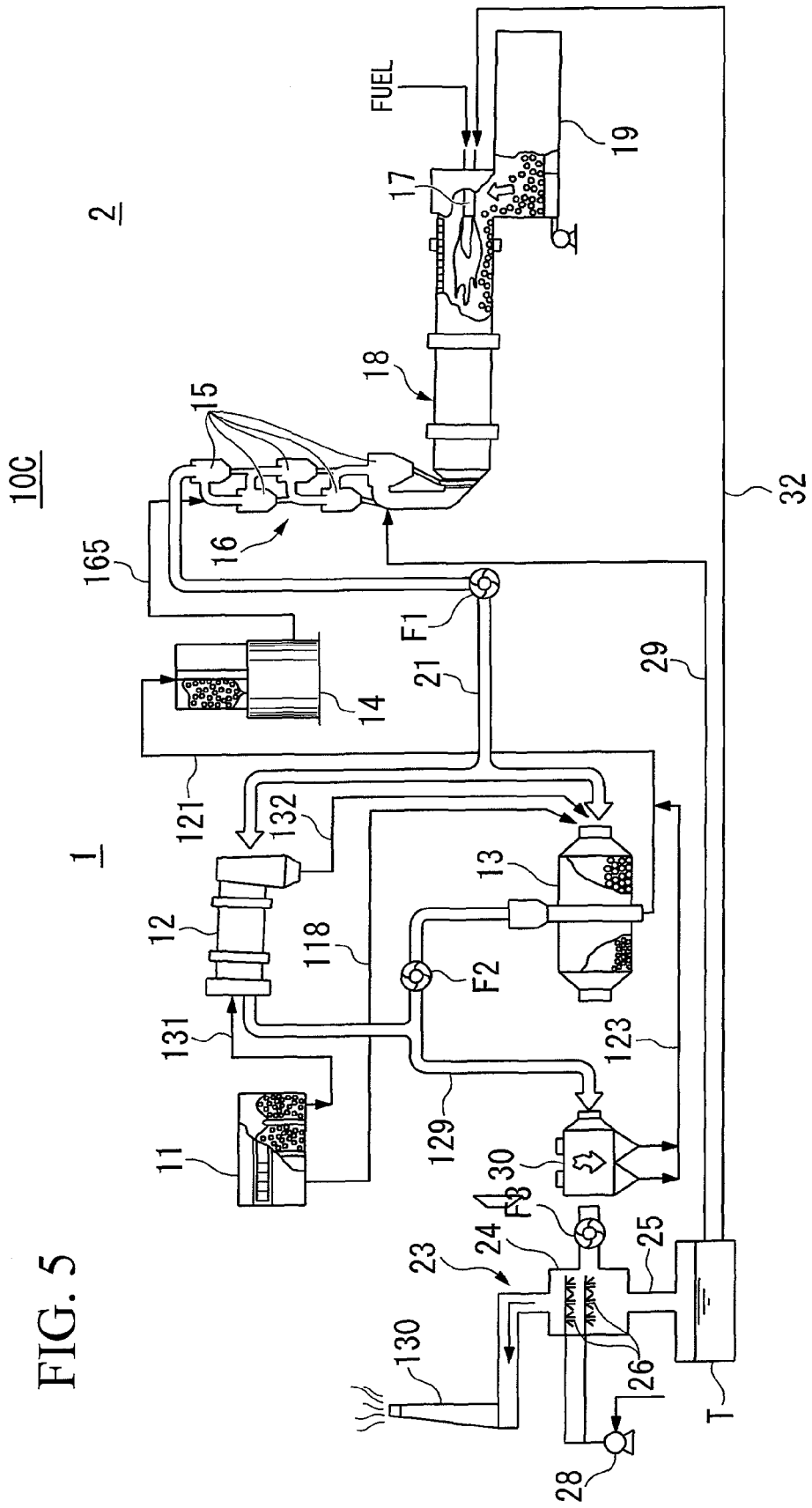
FIG. 5 is a schematic configuration diagram of cement production facility for carrying out Embodiment 3 of the method of the present invention for reducing organic chlorine compounds.
Figure 6:
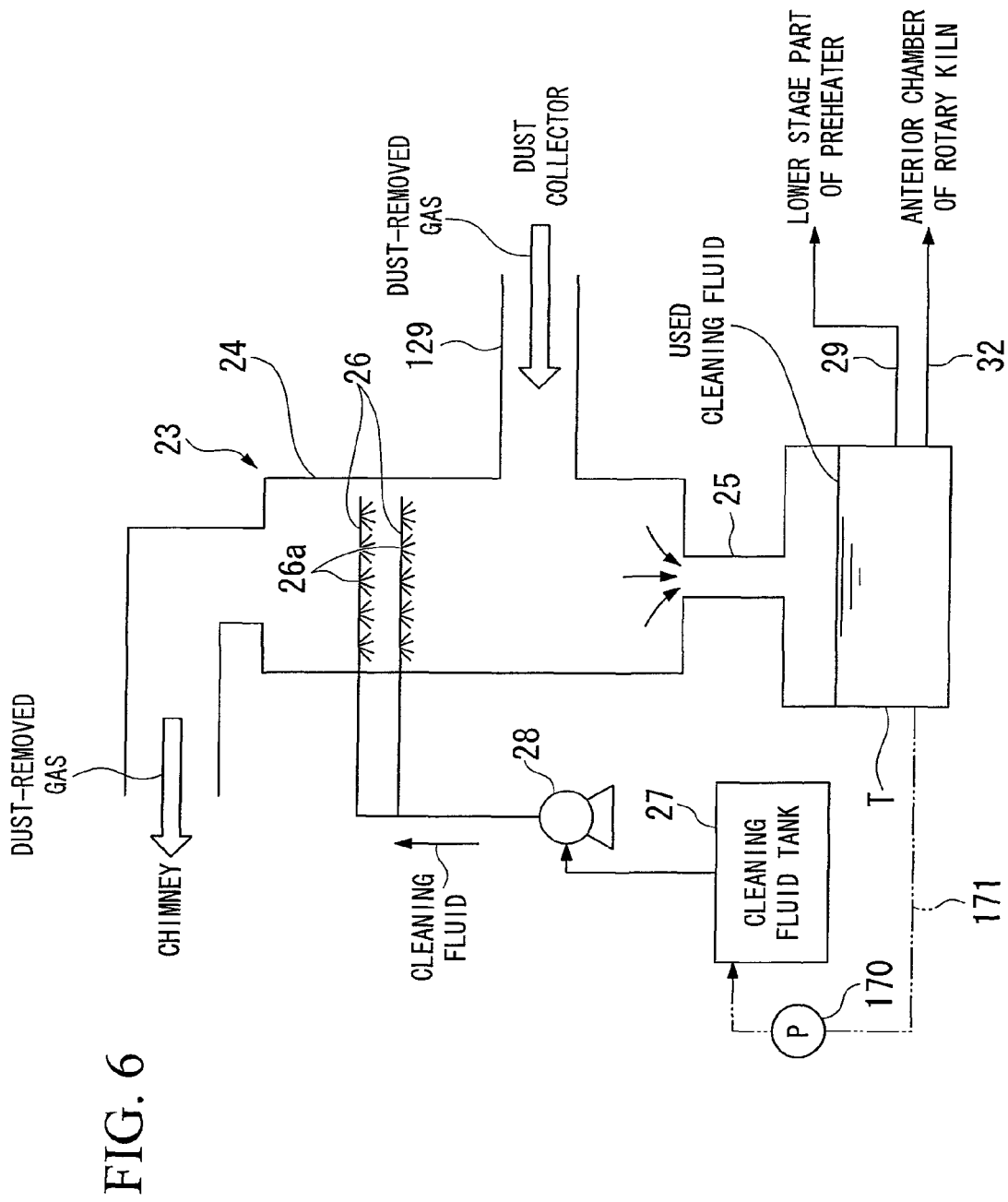
FIG. 6 is a schematic configuration diagram of a cleaning fluid spraying system mounted on the cement production facility given in FIG. 5.

As illustrated in FIG. 5, the cement production facility 10C of the present embodiment are provided with a raw material processing area 1 where cement raw materials are crushed and a calcination processing area 2 where the thus crushed cement raw materials are calcinated.

The raw material processing area 1 is provided with a raw material storage shed 11, a raw material dryer 12, a raw material mill 13, a storage silo 14, an electric dust collector 30 and a cleaning fluid spraying system (cleaning fluid spray means) 23. The cleaning fluid spraying system 23 is for spraying a cleaning fluid made up with oil or a mixture of oil with water on dust-removed gas flowing through the gas duct 129, dissolving organic chlorine compounds contained in the dust-removed gas and removing them.

The cleaning fluid spraying system 23 is installed on the gas duct 129, which is further downstream compared to the electric dust collector 30. A fan F2 is installed on the gas duct 129 connected to the raw material mill 13, and a fan F3 is installed on the gas duct 129 between the cleaning fluid spraying system 23 and the chimney 130. Exhaust gas used for heating the raw material dryer 12 and the raw material mill 13 is released into the atmosphere via the gas duct 129 and the chimney 130.

The electric dust collector 30 is connected to a halfway point of the crushed raw material transfer facility 121 via a dust delivery pipe 123. Dust collected by the electric dust collector 30 is fed into the storage silo 14 via the dust delivery pipe 123 and the crushed raw material transfer facility 121.

The cleaning fluid spraying system 23 is provided with a flush tank 24, a recovery tank T, two nozzles 26, a cleaning fluid tank 27 and a cleaning fluid pump 28. The flush tank 24 is installed on the gas duct 129. The flush tank 24 is a cylindrical vessel with a capacity of 10 kiloliters. A gas duct 129 communicatively connected to the electric dust collector 30 is connected to the lower side wall of the flush tank 24. Further, a gas duct 129 communicatively connected to the chimney 130 is connected to the upper part of the flush tank 24. The nozzle 26 is placed on the upper part of the flush tank 24 so as to extend laterally. The nozzle 26 is sealed at the leading end. A number of spray ports 26a are formed on the side face of the nozzle 26 so as to be opened downward and spaced equally from each other in the longitudinal direction of the nozzle 26.

Two nozzles 26 are able to spray a cleaning fluid in a combined quantity of 0.83 m$^3$ per minute. The recovery tank T is connected to the bottom of the flush tank 24 via a drain pipe 25. One end of a first drain supply pipe (cleaning fluid supply channel) 29 is connected to one end of a second drain supply pipe (cleaning fluid supply channel) 32 at the bottom of the recovery tank T. A drain supply pump and a valve (neither of them is illustrated) are respectively installed on the first drain supply pipe 29 and the second drain supply pipe 32. The cleaning fluid includes a solution prepared by mixing 5% solution of sodium hydroxide (NaOH) with light oil at the ratio of 1 to 1. The cleaning fluid spraying system 23 is able to treat dust-removed gas in a quantity of 10 m$^3$ per minute.

The cleaning fluid pump 28 pressure-feeds a cleaning fluid retained at the cleaning fluid tank 27 to a nozzle 26. The nozzle 26 sprays via the spray port 26a the cleaning fluid pressure-fed from the cleaning fluid tank 27 into dust-removed gas passing through the flush tank 24. The thus sprayed cleaning fluid absorbs organic chlorine compounds contained in the dust-removed gas, flowing into the recovery tank T. Dust-removed gas, from which organic chlorine compounds are removed, is released into the atmosphere from the chimney 130 via the gas duct 129. The cleaning fluid, which has flowed into the recovery tank T, is distributed to the first drain supply pipe 29 and the second drain supply pipe 32 at a predetermined ratio, supplied to the lowermost stage of the preheater 16 (a high temperature part) from the recovery tank T via the first drain supply pipe 29 and also supplied to the anterior chamber of the rotary kiln 18 (a high temperature part) from the recovery tank T via the second drain supply pipe 32. Alternatively, the cleaning fluid is supplied to the lowermost stage of the preheater 16 or the anterior chamber of the rotary kiln 18 either via the first drain supply pipe 29 or the second drain supply pipe 32.

A description will be given of a method for reducing organic chlorine compounds, which is conducted inside (inside the system) of the cement production facility 10C of the present embodiment.

First, as illustrated in FIG. 5, cement raw materials (limestone, clay, silica stone and iron material) stored at the raw material storage shed 11 are fed into the raw material mill 13 via the raw material transfer facility 118. However, some of the cement raw materials high in water content such as clay are fed into a raw material dryer 12 via raw material supply facility 131 and dried by the raw material dryer 12, and thereafter fed into the raw material mill 13 via dried raw material discharge facility 132. Since high-temperature exhaust gas from the upper part of the preheater 16 is introduced via an exhaust gas duct 21 into the raw material dryer 12 and the raw material mill 13, the raw material dryer 12 and the raw material mill 13 are kept thereinside respectively at about 300° C. or higher and 100° C. or higher. Therefore, in the raw material mill 13, cement raw materials containing dried clay supplied from the raw material dryer 12 are heated up to about 100° C. and also crushed by a number of metal balls into pieces with a grain size of about 90 μm or smaller. The thus crushed cement raw materials are fed into the storage silo 14 via crushed raw material transfer facility 121.

Where organic chlorine compounds such as dioxins and PCBs or waste containing organic matter and chlorine (municipal waste and incinerated ash) are included in cement raw materials, organic chlorine compounds contained in cement raw materials which are fed into the raw material mill 13 are heated inside the raw material mill 13 kept at about 100° C. or higher and separated from the cement raw materials accordingly. Further, organic chlorine compounds contained in cement raw materials which are fed into the raw material dryer 12 are heated inside the raw material dryer 12 kept at about 300° C. or higher and decomposed (evaporated).

Since exhaust gas introduced into the raw material dryer 12 and the raw material mill 13 is deprived of heat by heating cement raw materials, the exhaust gas at the entrance of an electric dust collector 30 is decreased in temperature to about 90° C. Organic chlorine compounds separated or decomposed from the cement raw materials are substantially adsorbed by dust in the exhaust gas. Dust, which has adsorbed the organic chlorine compounds, is collected by the electric dust collector 30 in the course of being guided into the chimney 130 via the gas duct 129. The thus collected dust is fed into the storage silo 14 via the dust delivery pipe 123 and the crushed raw material transfer facility 121.

Dust-removed gas, which has passed through the electric dust collector 30, flows into the flush tank 24 of the cleaning fluid spraying system 23. A cleaning fluid is sprayed from the nozzle 26 into the dust-removed gas, which has flowed into the flush tank 24, by which organic chlorine compounds are removed. The dust-removed gas, from which organic chlorine compounds are removed, is released into the atmosphere from the chimney 130 via the gas duct 129. The cleaning fluid, which flows into the recovery tank T, is distributed to a first drain supply pipe 29 and a second drain supply pipe 32 at a predetermined ratio, supplied to the lowermost stage of the cyclone (a high temperature part) 15 of the preheater 16 from the recovery tank T via the first drain supply pipe 29 and also supplied to the anterior chamber of the rotary kiln 18 (a high temperature part) from the recovery tank T via the second drain supply pipe 32.

Cement raw materials (including dust) stored at the storage silo 14 are supplied to the preheater 16 via the heated raw material powder transfer facility 165, and heated in the course of flowing down sequentially from the uppermost stage of the cyclone 15 of the preheater 16 to the lower stage of the cyclone 15. In this instance, a cleaning fluid supplied from the recovery tank T via the first drain supply pipe 29 is heated at the lowermost stage of the cyclone 15 of the preheater 16. The lowermost stage of the cyclone 15 is thereinside at a temperature of about 850° C. higher than the temperature at which dioxins are thermally decomposed, and all organic chlorine compounds such as dioxins and PCBs contained in the cleaning fluid are heat-treated and rendered harmless.

Cement raw materials preheated up to about 800° C. by the preheater 16 are fed into the posterior chamber of the rotary kiln 18. At the anterior chamber of the rotary kiln 18, cement clinker is calcinated from cement raw materials by the heat of the burner 17. In this instance, a cleaning fluid supplied from the recovery tank T via the second drain supply pipe 32 is partially burnt as a part of fuel of the burner 17. The burner 17 burns at about 1450° C., and all organic chlorine compounds such as dioxins and PCBs contained in the cleaning fluid are heat-treated and rendered harmless. The thus calcinated cement clinker is cooled by a clinker cooler 19 and thereafter stored at a clinker silo.

In the cement production facility 10C of the present embodiment, exhaust gas generated on calcination of the cement clinker from cement raw materials is allowed to be in contact with a cleaning fluid, thus absorbing organic chlorine compounds by the cleaning fluid. Then, the cleaning fluid, which has passed through an organic matter absorbing step, is recovered to remove organic chlorine compounds from the exhaust gas. Thereby, it is possible to reduce the quantity of organic chlorine compounds such as dioxins and PCBs exhausted from cement production facility to a greater extent compared to conventional facility.

The recovery tank T may be connected to the cleaning fluid tank 27 via a return pipe 171. In this instance, a return pump 170 is installed on the return pipe 171. The cleaning fluid, which has absorbed organic chlorine compounds, is returned via the return pipe 171 to the cleaning fluid tank 27 on actuation of the return pump 170. As described so far, a cleaning fluid is reused, thereby making it possible to reduce running costs of the cleaning fluid spraying system 23.

The cement production facility 10C of the present embodiment were operated to study organic chlorine compounds in dust-removed gas which were removed in the cleaning fluid spraying system 23.

|  | Quantity reduced (percent by mass) |
| --- | --- |
| PCBs | 95 |
| Acetaldehyde | 90 |
| Methyl alcohol | 80 |
| Chlorophenol | 100 |
| Propanol | 80 |
| Acetone | 80 |

As apparent from Table 1, representative harmful substances to be removed from dust-removed gas, that is, PCBs, acetaldehyde, methyl alcohol, chlorophenol, propanol and acetone, were all removed by 80 percent by weight or more.

A description will be given of a method for reducing organic chlorine compounds in the cement production facility of the present invention and Embodiment 4 of the cement production facility by referring to FIG. 7. It is noted that constituents already described in Embodiment 1 are given the same symbols or numerals, description of which will be omitted.

Figure 7:
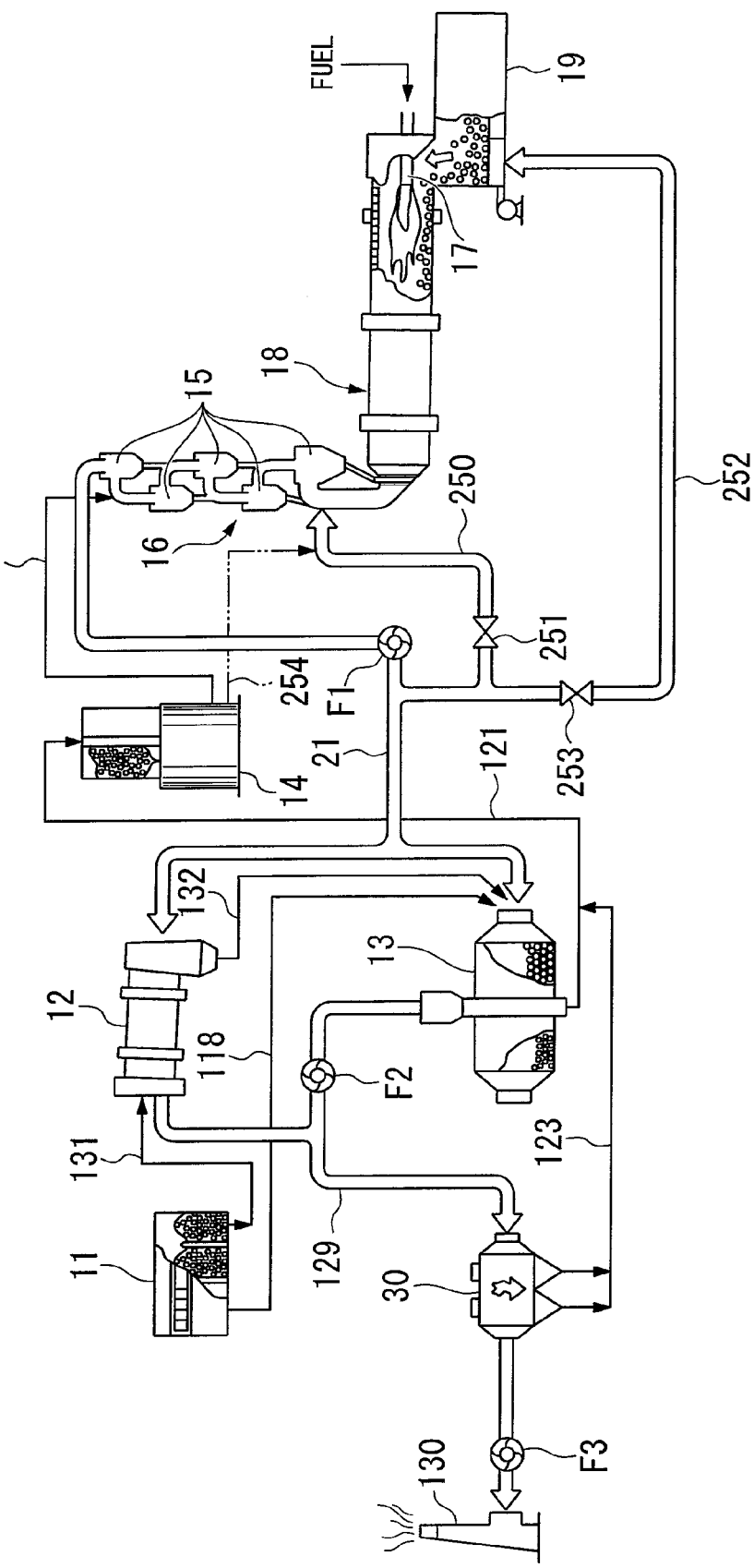
FIG. 7 is a schematic configuration diagram of cement production facility for carrying out Embodiment 4 of the method of the present invention for reducing organic chlorine compounds.

As illustrated in FIG. 7, in the cement production facility 10D of the present embodiment, an exhaust gas duct 21 between a fan F1 and a branched portion is connected to the lower stage of the preheater 16 via a first exhaust gas branched pipe (exhaust gas supply channel) 250. A valve 251 is installed on the first exhaust gas branched pipe 250. The first exhaust gas branched pipe 250 between a connected portion with the exhaust gas duct 21 and the valve 251 is connected via the second exhaust gas branched pipe 252 (exhaust gas supply channel) to the upstream part of the clinker cooler 19 (in the vicinity of a feeding part of the cement clinker). A valve 253 is installed on the second exhaust gas branched pipe 252. Exhaust gas at a temperature of 300° C. or higher from the upper part of the preheater 16 is supplied via the exhaust gas duct 21 to the raw material dryer 12 and the raw material mill 13. In addition, the exhaust gas is supplied via the first exhaust gas branched pipe 250 to the lower stage of the preheater 16 and also supplied via the second exhaust gas branched pipe 252 to the upstream part of the clinker cooler 19.

A description will be given of a method for reducing organic chlorine compounds which is conducted inside (inside the system) of the cement production facility 10D of the present embodiment.

First, as illustrated in FIG. 7, cement raw materials (limestone, clay, silica stone and iron material) stored at the raw material storage shed 11 are fed via the raw material transfer facility 118 to the raw material mill 13. However, some of the cement raw materials high in water content such as clay are fed into the raw material dryer 12 via the raw material supply facility 131, dried by the raw material dryer 12, and thereafter fed to the raw material mill 13 via the dried raw material discharge facility 132. A fan F1 is actuated, by which high-temperature exhaust gas from the upper part of the preheater 16 is introduced via the exhaust gas duct 21 to the raw material dryer 12 and the raw material mill 13. The high-temperature exhaust gas is introduced, by which the raw material dryer 12 and the raw material mill 13 are kept thereinside respectively at about 300° C. or higher and 100° C. or higher. Therefore, in the raw material mill 13, cement raw materials, which contain dried clay supplied from the raw material dryer 12, are heated up to about 100° C. and crushed into pieces with a grain size of about 90 μm or smaller by a number of metal balls. The thus crushed cement raw materials are fed via the crushed raw material transfer facility 121 to the storage silo 14.

Where organic chlorine compounds such as dioxins and PCBs or waste containing organic matter and chlorine (municipal waste and incinerated ash) are included in cement raw materials, organic chlorine compounds contained in the cement raw materials which are fed into the raw material mill 13 are heated inside the raw material mill 13 kept at about 100° C. or higher and separated from the cement raw materials accordingly. Further, organic chlorine compounds contained in cement raw materials which are fed into the raw material dryer 12 are heated inside the raw material dryer 12 kept at about 300° C. or higher and decomposed (evaporated).

Since exhaust gas introduced into the raw material dryer 12 and the raw material mill 13 is deprived of heat by heating cement raw materials, the exhaust gas at the entrance of an electric dust collector 30 is decreased in temperature to about 90° C. Organic chlorine compounds separated or decomposed from the cement raw materials are substantially adsorbed by dust in the exhaust gas. Dust, which has adsorbed the organic chlorine compounds, is collected by the electric dust collector 30 in the course of being guided into the chimney 130 via the gas duct 129. The thus collected dust is fed into the storage silo 14 via the dust delivery pipe 123 and the crushed raw material transfer facility 121.

An adsorbing powder (coal fine powder) is fed into the gas duct 129 via a feeding port 150. The thus fed adsorbing powder is in contact with dust-removed gas, which has passed through the electric dust collector 30, thereby adsorbing organic chlorine compounds such as dioxins and PCBs contained in the dust-removed gas. The adsorbing powder, which has adsorbed the organic chlorine compounds, flows into the bag filter 31 together with the dust-removed gas, and only the adsorbing powder is attached to a membrane filter 161 of a filter cloth 160, while the dust-removed gas passes through the filter cloth 160. Upon attachment of the adsorbing powder on the membrane filter 161, the organic chlorine compounds contained in the adsorbing powder are in contact with an organic chlorine compound-decomposing catalyst and decomposed by decomposition action of the catalyst. Thereby, the adsorbing powder is rendered harmless. The adsorbing powder rendered harmless by the bag filter 31 is supplied via an adsorbing-powder delivery pipe 22 to a fuel feeding port of the burner 17. The dust-removed gas, which has passed through the bag filter 31, is released into the atmosphere via the gas duct 129 and the chimney 130.

Cement raw materials (including dust) stored at the storage silo 14 are supplied to the preheater 16 via heated raw material powder transfer facility 165, and preheated in the course of flowing down sequentially from the uppermost stage of the cyclone 15 of the preheater 16 to the lower stage of the cyclone 15. Cement raw materials preheated up to about 800° C. by the preheater 16 are fed into the posterior chamber of the rotary kiln 18. At the anterior chamber of the rotary kiln 18, cement clinker is calcinated from cement raw materials by the heat of the burner 17. The thus calcinated cement clinker is cooled by a clinker cooler 19 and thereafter stored at a clinker silo.

When the fan F1 is actuated, the exhaust gas duct 21, which is further upstream compared to the fan F1, is kept negative in pressure thereinside and the exhaust gas duct 21, which is further downstream compared to the fan F1, is kept positive in pressure thereinside. On the other hand, the lower stage part of the preheater 16 and the upstream part of the clinker cooler 19 are both negative in pressure thereinside. Therefore, when the fan F1 is actuated and the valve 251 is also opened, high-temperature exhaust gas from the upper part of the preheater 16 is partially supplied via the first exhaust gas branched pipe 250 to the lower stage part of the preheater 16. Further, when the fan F1 is actuated and the valve 253 is also opened, the high-temperature exhaust gas from the upper part of the preheater 16 is partially supplied via the second exhaust gas branched pipe 252 to the upstream part of the clinker cooler 19. It is noted that exhaust gas may be partially supplied to the lower stage part of the preheater 16 and the upstream part of the clinker cooler 19, with the valves 251 and 253 being opened.

The exhaust gas supplied via the first exhaust gas branched pipe 250 to the lower stage part of the preheater 16 is heated at the lowermost stage of the cyclone 15 of the preheater 16. The lowermost stage of the cyclone 15 is at a temperature of about 850° C. thereinside, higher than a temperature at which dioxins are thermally decomposed, and all organic chlorine compounds such as dioxins and PCBs contained in the exhaust gas are heat-treated and rendered harmless.

Exhaust gas supplied via the second exhaust gas branched pipe 252 to the upstream part of the clinker cooler 19 is heated at the upstream part of the clinker cooler 19. The upstream part of the clinker cooler 19 is at a temperature of about 800° C., higher than a temperature at which dioxins are thermally decomposed, and all organic chlorine compounds such as dioxins and PCBs contained in the exhaust gas are heat-treated and rendered harmless.

In the cement production facility 10D of the present embodiment, exhaust gas generated on calcination of the cement clinker from cement raw materials is supplied to a high temperature part of cement production facility, thereby thermally decomposing organic chlorine compounds contained in the exhaust gas. Thereby, circulation of organic chlorine compounds is cut off in raw material processes of cement production, inhibiting the above-mentioned increase in concentration of the organic chlorine compounds. As a result, it is possible to reduce the quantity of organic chlorine compounds such as dioxins and PCBs exhausted from cement production facility 10D to a greater extent compared to conventional facility.

The storage silo 14 may be connected via a raw material fractionating pipe (cement raw materials supply channel) 254 to the upstream end of the first exhaust gas branched pipe 250. Some of the cement raw materials inside the storage silo 14 flow into the first exhaust gas branched pipe 250 via the raw material fractionating pipe 254 and are supplied to the lower stage part of the preheater 16 together with exhaust gas flowing through the first exhaust gas branched pipe 250. Thereby, it is possible to reduce the quantity of organic chlorine compounds such as dioxins and PCBs exhausted from the cement production facility 10D.

Operation of the cement production facility 10D of the present embodiment compared to that of conventional cement production facility to study the reduction rate of organic chlorine compounds in exhaust gas released into the atmosphere (at the time of basic unit for usage of heated raw material: 50 kg/t·cli). As a result, where high-temperature exhaust gas from the upper part of the preheater 16 was partially supplied via the first exhaust gas branched pipe 250 to the lower stage part of the preheater 16, PCBs found in dust-removed gas was reduced by 60 percent by weight compared to that found in the conventional facility. PCBs are representative harmful substances to be removed from the dust-removed gas. Further, where some of the cement raw materials were supplied to the lower stage part of the preheater 16 together with exhaust gas flowing through the first exhaust gas branched pipe 250, PCBs found in the dust-removed gas were reduced by 60 percent by weight compared to that found in the conventional facility.

INDUSTRIAL APPLICABILITY

The present invention relates to a method for reducing organic chlorine compounds in the cement production facility by which a quantity of the organic chlorine compounds contained in cement raw materials is reduced in the cement production facility, and the method for reducing organic chlorine compounds in the cement production facility, which is provided with an organic matter adsorbing step in which an adsorbing powder is supplied into exhaust gas generated on calcination of the cement clinker from the cement raw materials, thus adsorbing the organic chlorine compounds on the adsorbing powder and an adsorbing-powder removing step in which the adsorbing powder on which organic chlorine compounds are adsorbed is collected to remove the adsorbing powder from the exhaust gas.

According to the present invention, it is possible to reduce the quantity of organic chlorine compounds such as dioxins and PCBs exhausted from the cement production facility to a greater extent than conventional facility.

The invention claimed is:

1. A method for reducing an amount of an organic chlorine compound emitted from a cement production facility, comprising:
   passing an exhaust gas generated from calcination of cement raw materials through an electric dust collector, thereby producing dust-removed gas;
   adding to said dust-removed gas an adsorbing powder, wherein said dust-removed gas comprises an organic chlorine compound, such that said organic chlorine compound is adsorbed on the surface of said adsorbing powder;
   passing said dust-removed gas at a temperature of from 210° C. to 230° C. through a bag filter comprising a membrane filter having a titanium-vanadium catalyst impregnated therein, said titanium-vanadium catalyst operable for decomposing an organic chlorine compound;
   adding said adsorbing powder into a fuel to form a mixture for calcination of cement raw materials; and
   heating said mixture at a temperature of 1500° C. or higher during said calcination.

2. A method according to claim 1, wherein dust removed from said exhaust gas by said electric dust collector has an organic chlorine compound present on a surface thereof.

3. A method according to claim 1, wherein said adsorbing powder is at least one selected from the group consisting of coal fine powder, activated carbon fine powder and coke fine powder.

4. A method according to claim 3, wherein said coal fine powder has a grain size of from 20 to 70 µm.

5. A method according to claim 3, wherein said activated carbon fine powder has a grain size of from 10 to 100 µm.

6. A method according to claim 1, wherein said organic chlorine compound is polychlorinated biphenyl.

7. A method according to claim 1, wherein said organic chlorine compound is polychlorinated biphenyl or a dioxin.

8. A method according to claim 1, wherein said adsorbing powder is porous.

9. A method of making cement, comprising:
   calcining a cement raw material in a rotary kiln;
   passing an exhaust gas generated from calcination of cement raw materials through an electric dust collector, thereby producing dust-removed gas;
   adding to said dust-removed gas an adsorbing powder, wherein said dust-removed gas comprises an organic chlorine compound, such that said organic chlorine compound is adsorbed on the surface of said adsorbing powder;
   passing said dust-removed gas at a temperature of 210° C. to 230° C. through a bag filter comprising a membrane filter having a titanium-vanadium catalyst impregnated therein, said titanium-vanadium catalyst operable for decomposing an organic chlorine compound;
   adding said adsorbing powder into a fuel to form a mixture for calcination of cement raw materials; and
   heating said mixture at a temperature of 1500° C. or higher during said calcination.

10. In a method for making cement, which comprises generating an exhaust gas which comprises an organic chlorine compound, the improvement comprising reducing the amount of said organic chlorine compound by
   passing an exhaust gas generated from calcination of cement raw materials through an electric dust collector, thereby producing dust-removed gas;
   adding to said dust-removed gas an adsorbing powder, wherein said dust-removed gas comprises an organic chlorine compound, such that said organic chlorine compound is adsorbed on the surface of said adsorbing powder;
   passing said dust-removed gas at a temperature of 210° C. to 230° C. through a bag filter comprising a membrane filter having a titanium-vanadium catalyst impregnated therein, said titanium-vanadium catalyst operable for decomposing an organic chlorine compound;
   adding said adsorbing powder into a fuel to form a mixture for calcination of cement raw materials; and
   heating said mixture at a temperature of 1500° C. or higher during said calcination.

11. A method of reducing the amount of an organic chlorine compound in the exhaust gas of a cement production facility, comprising:
   passing an exhaust gas generated from calcination of cement raw materials through an electric dust collector, thereby producing dust-removed gas;
   adding to said dust-removed gas an adsorbing powder, wherein said exhaust gas comprises an organic chlorine compound and dust, such that said organic chlorine compound is adsorbed on the surface of said adsorbing powder;
   passing said exhaust gas through a bag filter comprising a membrane filter having a titanium-vanadium catalyst impregnated therein, said titanium-vanadium catalyst operable for decomposing an organic chlorine compound;
   adding said adsorbing powder into a fuel to form a mixture for calcination of cement raw materials; and
   heating said mixture at a temperature of 1500° C. or higher during said calcination.

* * * * *